Sept. 2, 1958  C. M. WEBSTER  2,850,094
TIRE WINTERIZER
Filed Sept. 12, 1956  4 Sheets-Sheet 1
FIG. 1
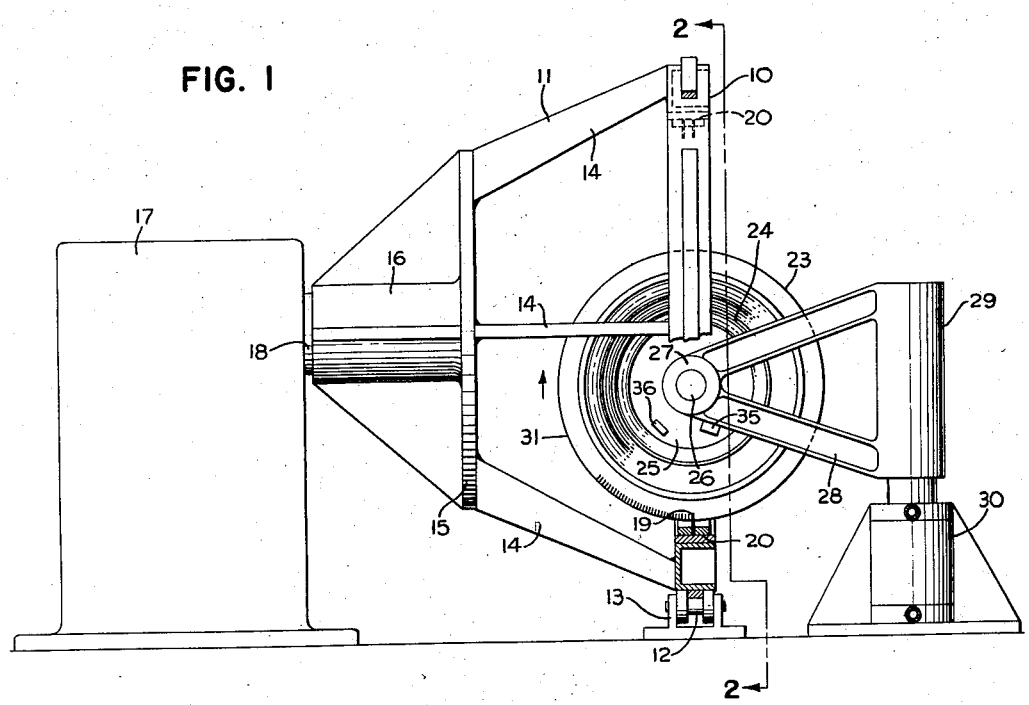
FIG. 4
FIG. 2
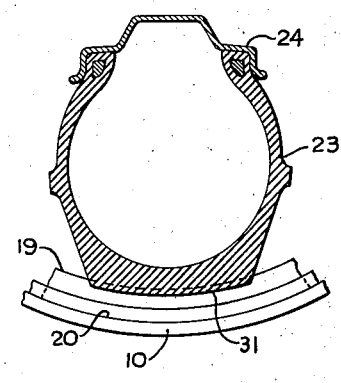
INVENTOR.
CARL M. WEBSTER
BY
R. L. Miller
ATTORNEY Sept. 2, 1958 C. M. WEBSTER 2,850,094
TIRE WINTERIZER
Filed Sept. 12, 1956 4 Sheets-Sheet 2

INVENTOR.
CARL M. WEBSTER
BY
R. L. Miller
ATTORNEY

Sept. 2, 1958  C. M. WEBSTER  2,850,094
TIRE WINTERIZER
Filed Sept. 12, 1956  4 Sheets-Sheet 3

INVENTOR.
CARL M. WEBSTER
BY
ATTORNEY

INVENTOR.
CARL M. WEBSTER

United States Patent Office 2,850,094
Patented Sept. 2, 1958

2,850,094

TIRE WINTERIZER

Carl M. Webster, Akron, Ohio, assignor to The Goodyear Tire & Rubber Company, Akron, Ohio, a corporation of Ohio Application September 12, 1956, Serial No. 609,479

9 Claims. (Cl. 164—10.2)

This invention relates to an apparatus for cutting tire treads, and more particularly it relates to an apparatus for cutting tire treads in a plane transversely thereof for the purpose of improving the anti-skid properties of the tread.

It is an object of this invention to provide an apparatus for slitting or cutting tire treads in a transverse flat plane with the edges of the knife passing substantially parallel to the tread surface.

Another object of the invention is to provide an economical device for slitting tires transversely at constant depth and in a straight plane by means of a helical-shaped cutting blade.

These and other objects will appear from the accompanying description and drawings in which:

Fig. 1 is an elevational view of the apparatus embodying this invention;

Fig. 2 is a cross-sectional view taken along the lines 2—2 of Fig. 1;

Fig. 4 is an enlarged sectional view of the tire engaging the knives;

Figure 3:
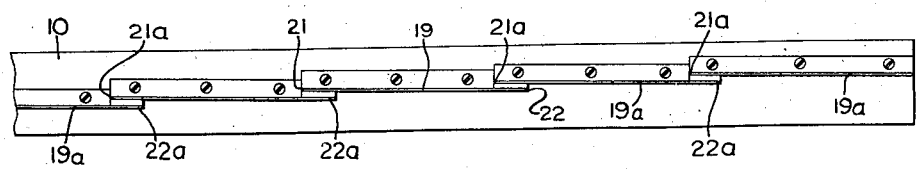
Fig. 3 is a layout of the cutting knives showing in plan the relative relationship thereof.

Referring to the drawings, and first to the embodiment of the invention shown in Figs. 1, 2 and 3 of the drawings, a ring-shaped carriage 10, having an internal diameter larger than the overall diameter of the tire to be cut, is supported for rotation in a fixed plane by a spider 11 secured to the carriage. A plurality of rolls 12 are supported in brackets 13 and engage the outer periphery of the carriage 10 so as to provide additional radial support for the carriage during the cutting operation. The spider 11 is constructed of a plurality of web members 14 extending in a generally conical plane and secured to the plate 15 provided with a coupling 16. The spider 11 is driven by a motor 17 having a shaft 18 splined or otherwise secured to the coupling 16.

The knife 19 is supported on the radially inner surface 20 of the ring-shaped carriage 10 and projects radially inwardly therefrom. The knife 19 is preferably made from spring steel and extends continuously around the circumference of the radially inner surface 20 in a helical path. The leading edge 21 of the knife 19 overlaps the trailing edge 22 thereof, as shown in Fig. 2, and the knife is secured by suitable screws in a slot machined in the surface 20 extending in a helical path relative to the axis of the carriage 10. The pitch of the helical path and the distance between the overlapping edges 21 and 22 are equal to the desired spacing of the slits in the tire.

The tire 23 to be cut is supported for free rotation about its axis and is preferably mounted upon a rim 24 of the wheel 25 secured to stub axle 26 which is freely rotatable in bearing 27 of the support 28. The support 28 extends in an axial direction relative to the carriage 10 and is secured to a pedestal 29 which may be moved in a radial direction relative to the carriage 10 by means of a pneumatic or hydraulic air cylinder 30.

In operation, the motor 17 is energized so as to drive the carriage 10 and the tire 23, properly inflated and mounted on the wheel 24, is lowered or moved in a radial direction relative to the carriage 10 by energizing a solenoid valve (not shown) to admit fluid under pressure to the cylinder 30 so that the tread 31 thereof is positioned within the plane of the rotating knife 19. When the knife 19 engages the tread 31 as the tire 23 is lowered, the knife 19 cuts slits in the tire and causes the tire to rotate about its axis a distance equal to the distance between the trailing and leading edge of the knife.

After the entire tread has been cut, or the tire rotated for 360°, the cylinder 30 is actuated so as to retract the support 28 in a radially inward direction relative to the carriage 10 thereby removing the tread from engagement with the knife. Many methods will be apparent to those skilled in the art whereby the cylinder can be actuated manually or automatically at the instant the entire tread has been cut. For example, the solenoid valve for controlling fluid pressure to cylinder 30, may be manually de-energized when the operator observes that the tire has made one revolution. Preferably, the solenoid is de-energized by a limit switch 35 which is opened by a member 36 secured to the wheel 24.

The carriage 10 may be provided with a plurality of cutters 19—19a extending at an angle to the axis of rotation of the carriage and, as shown in Fig. 3, the leading edge 21—21a of each cutter is axially displaced from and overlaps the trailing edge 22—22a of the next succeeding cutter. It is evident that one revolution of the carriage 10 will impart a number of slits to the tire tread equal to the number of cutters 19—19a. As each leading edge 21—21a of any of the cutters begins a new cut the cutter will follow through the new slit and rotate the tire a distance equal to the distance between the respective overlapping trailing and leading edges of the cutters before the next succeeding leading edge begins a new cut.

Figure 7:
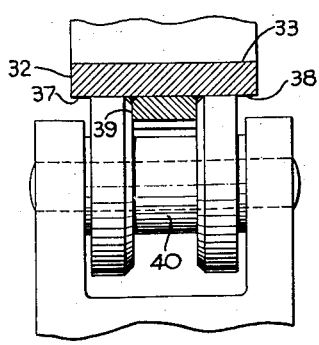
Fig. 7 is a cross-sectional view taken along the lines 7—7 of Fig. 5.
Figure 5:
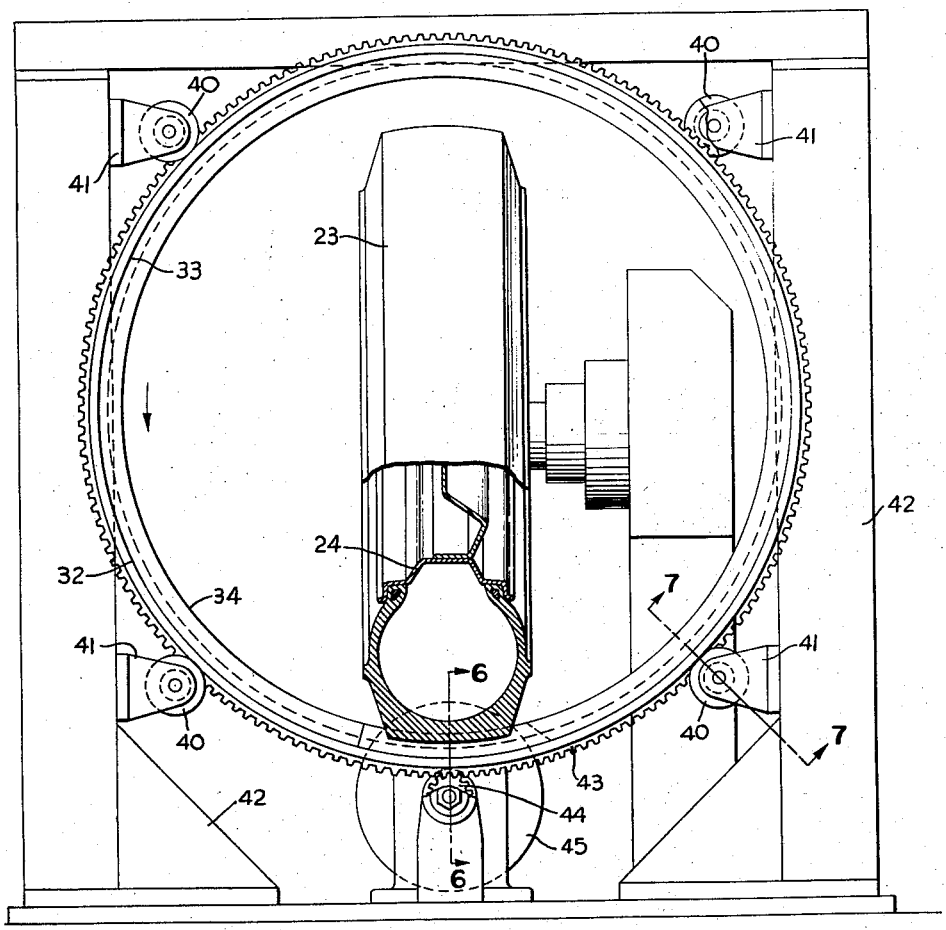
Fig. 5 is a front elevational view of another embodiment of the invention.
Figure 6:
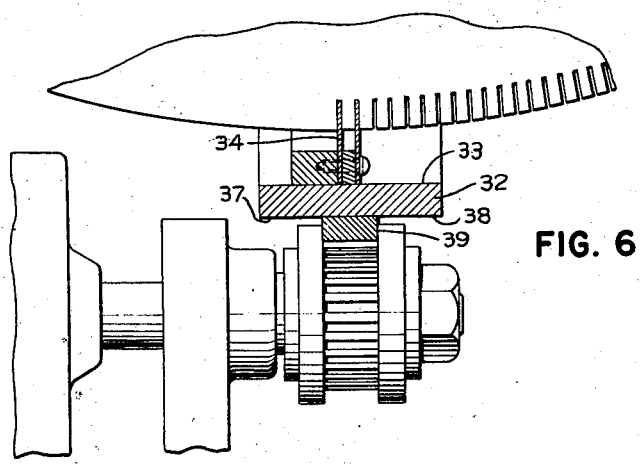
Fig. 6 is a cross-sectional view taken along the line 6—6 of Fig. 5.

In the embodiment of the invention shown in Figs. 5, 6 and 7 of the drawings, the operation and function of the apparatus is the same as that disclosed in Figs. 1 through 4. The ring-shaped carriage 32 is provided having a radially inner surface 33 supporting the helically disposed knife or knives 34 in a manner similar to that shown in Figs. 1 through 4. The radially outer surface 37 of the carriage 32 is provided with an axially extending surface 38 and a radially extending surface 39 which are engaged respectively by the carriage supporting rolls 40. Each of the rolls 40 are rotatably supported on the brackets 41 secured to the frame 42 so that the respective rolls engage the carriage 32 at circumferentially spaced locations whereby the carriage is supported in a fixed plane for rotation about its axis. The radially outer surface 37 of the carriage 32 is provided with a ring gear 43 meshing with a spur gear 44 which is driven by the motor 45. The tire 23 is supported for free rotation about its axis in the manner described with respect to Figs. 1 through 3.

Figure 9:
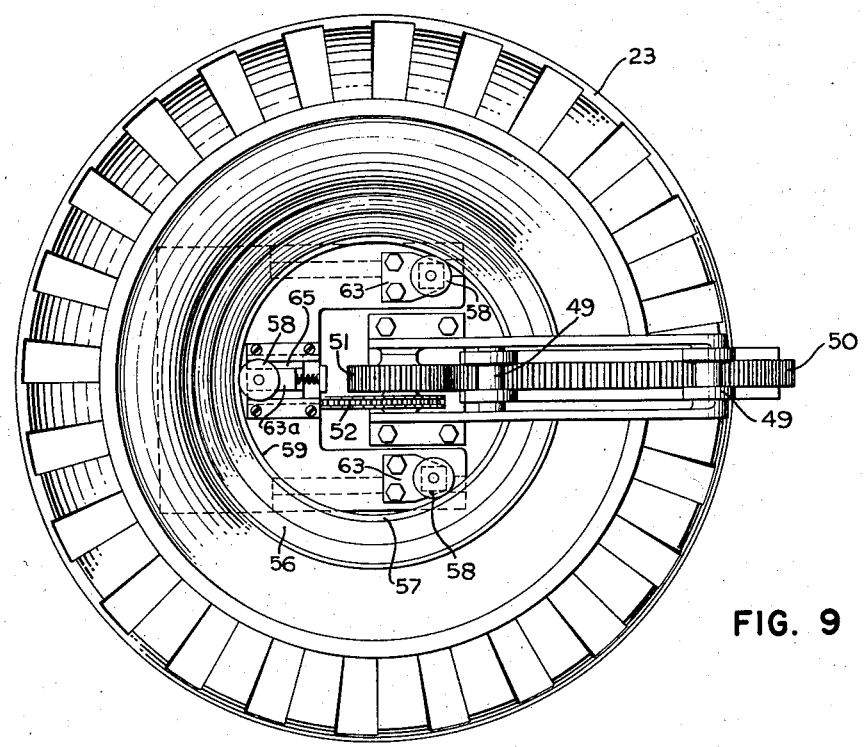
Fig. 9 is a plan view taken along the lines 9—9 of Fig. 8.
Figure 8:
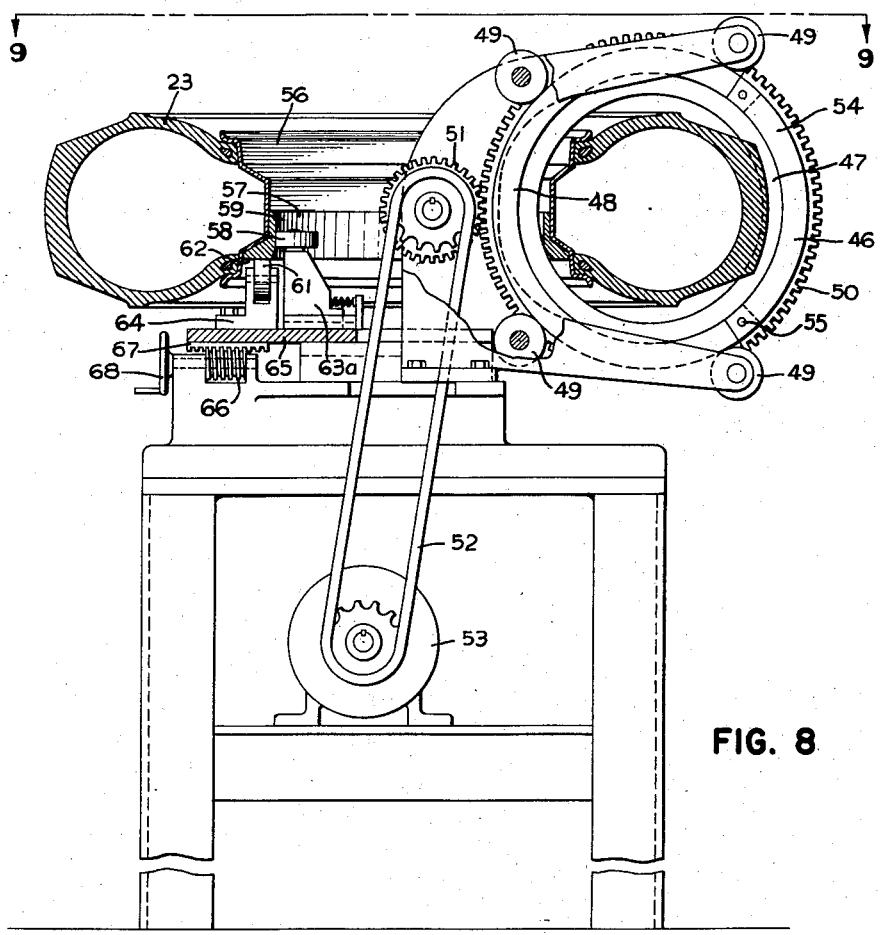
Fig. 8 is a front elevational view of another embodiment of the invention with parts being broken away.

Another modification of the invention is shown in Figs. 8 and 9 in which the knife carriage circumscribes a single section of the tire and therefore has an internal diameter less than the overall diameter of the tire 23 but greater than the sectional diameter thereof. The knife carriage 46, supporting one or more helically disposed knives 47, is of similar construction as the knife carriage 32 previously described except that the carriage 46 has a diameter slightly greater than the sectional diameter of the tire 23 and is provided with a hinged or split sector 48 so as to permit the tire 23 to be placed within the carriage 46.

In this embodiment of the invention, the carriage 46 is supported by a plurality of circumferential rolls 49 engaging the radially outer circumference of the carriage 46 so as to support the carriage in a fixed plane for rotation about the axis thereof. A ring gear 50 is secured to the carriage and is driven through suitable gear 51 connected by a chain 52 and driven by the motor 53. The carriage sector 54 is pivotably hinged at 55 to the carriage 46 so that it may be swingably moved relative to the carriage 46 to permit the tire 23 to be placed in proper position within the carriage as described hereinafter.

The tire 23 is mounted on a rim member 56 having an inwardly projecting flange 57 extending continuously around the inner circumference thereof. A plurality of rollers 58 engage the inner surface 59 of the flange 57 and a plurality of rollers 61 engage the lower surface 62 of the flange. The rolls 58 and 61 are supported by suitable brackets 63 and 64 respectively which are secured to the carriage 65 which is slidably mounted. The bracket 63a is slightly mounted relative to the carriage 65 and is urged by a compression spring to bear against the surface 59 of the rim flange 57.

In order to place the tire in operating position on the machine, the tire 23, mounted on the rim 56 and properly inflated, is inserted through the opening provided in the carriage 46 when the sector 54 is in open position and the tire is then lowered until the surface 62 of the flange 57 engages the rollers 61. During this operation the bracket 63a is radially inwardly of the surface 59 and thereafter moved radially outward into engagement with surface 59 of the flange 57 to thereby center the rim relative to the rollers 58. The slide member 65 supporting the brackets 64 and 63 is then moved by means of the worm 66 and gear 67 actuated manually by the wheel 68 so as to move the tire 23 in a radial direction relative to the knife carriage 46 until the tread thereof engages the knife 47.

In all of the embodiments of the invention it is seen that the cutting knife or knives are carried in a path subscribing at least one sector of the tire and that the path of the knife is in a plane passing diametrically through the sectors of the tire. The knife or knives thereby cut the tread of the tire in a straight line and the slits extend in a flat diametric plane relative to the radius of the tire. Furthermore, as shown in Fig. 4, since the cutting edge of each knife extends in a curved plane substantially parallel to the tread radius of the tire, the depth of cut is uniform across the tread of the tire relative to the cutting edge.

While certain representative embodiments and details have been shown for the purpose of illustrating the invention, it will be apparent to those skilled in this art that various changes and modifications may be made therein without departing from the spirit or scope of the invention.

I claim:

1. An apparatus for transversely cutting the treads of tires comprising in combination a carriage having a cylindrical radial inner surface, means rotatably supporting said carriage, said carriage supporting means engaging said carriage radially outward of said surface, means to rotate said carriage, means for supporting a tire for free rotation about its axis, said carriage having a path of rotation circumscribing at least one section of said tire, at least one cutting blade projecting radially inwardly from said surface and engaging the tread surface of said tire, said blade being helically disposed relative to the axis of rotation of said carriage.

2. An apparatus for transversely cutting the treads of tires as claimed in claim 1 in which means are provided for moving the tire supporting means in a direction radially inward relative to the axis of rotation of said carriage.

3. An apparatus for transversely cutting tires as claimed in claim 1 in which the carriage supporting means includes a plurality of rolls spaced circumferentially around said carriage and bearing against the radially outer surface of said carriage.

4. An apparatus as claimed in claim 1 in which the carriage is supported in a diametric plane relative to the section of said tire.

5. An apparatus for transversely cutting the treads of tires as claimed in claim 1 in which the means to rotate said carriage includes a circular gear secured to said carriage engaging a driving gear, said circular gear being concentric with and displaced radially outward from the cylindrical radial inner surface of said carriage.

6. An apparatus as claimed in claim 1 in which the means to rotate said carriage includes a spider frame connected to said carriage and extending axially thereof, said spider frame being driven by a motor, said carriage having a path of rotation circumscribing both sections of said tire.

7. An apparatus as claimed in claim 1 in which the means for rotatably supporting said carriage includes a frame, a plurality of rolls secured to said frame for engaging the radial outer surface of said carriage for supporting said carriage for rotation in a fixed plane, and said carriage rotating means includes a motor driven driving gear engaging a ring gear secured to said carriage radially outward of said surface.

8. An apparatus for transversely cutting the treads of tires as claimed in claim 5 in which said carriage has a path of rotation circumscribing only one section of said tire and is provided with a pivotable sector to permit the tire to be positioned within the carriage.

9. An apparatus for transversely cutting the treads of tires comprising in combiantion a carriage having a cylindrical radial inner surface, means rotatably supporting said carriage, said carriage supporting means engaging said carriage radially outward of said surface, means to rotate said carriage, means for supporting a tire for free rotation about its axis, said carriage having a path of rotation circumscribing at least one section of said tire, a plurality of cutting blades projecting radially inwardly from the said surface and engaging the tread surface of said tire, said blades having leading and trailing edges, the leading edge of each blade being displaced axially relative to the axis of the carriage from the trailing edge of the adjacent blade.

References Cited in the file of this patent

UNITED STATES PATENTS

| 2,717,639 | James | Sept. 13, 1955 |
| 2,741,307 | Meserve et al. | Apr. 10, 1956 |
| 2,752,996 | Riggs | July 3, 1956 |